United States Patent [19]
Huber

[11] Patent Number: 4,708,879
[45] Date of Patent: Nov. 24, 1987

[54] USE OF METAM SODIUM FOR PRESERVING HAY

[75] Inventor: Neil M. Huber, Bellevue, Wash.

[73] Assignee: Bio Techniques Laboratories, Inc., Redmond, Wash.

[21] Appl. No.: 828,495

[22] Filed: Feb. 11, 1986

[51] Int. Cl.$^4$ .................................................. A23K 3/00
[52] U.S. Cl. ..................................... 426/335; 426/532; 426/636
[58] Field of Search ............... 426/636, 321, 335, 532, 426/623, 630, 807; 514/478, 483, 476

[56] References Cited

U.S. PATENT DOCUMENTS

| | | | |
|---|---|---|---|
| 2,614,957 | 10/1952 | Somerville | 167/22 |
| 2,614,959 | 10/1952 | Somerville | 167/22 |
| 2,776,922 | 1/1957 | Somerville | 167/33 |
| 2,792,327 | 5/1957 | Hunt | 167/22 |
| 2,835,625 | 5/1958 | Lo et al. | 514/478 |
| 3,699,231 | 10/1972 | Werlein et al. | 424/286 |
| 3,836,655 | 8/1974 | Kensler, Jr. et al. | 424/286 |
| 4,064,276 | 12/1977 | Conradsen et al. | 426/69 |
| 4,203,999 | 5/1980 | Martin et al. | 424/286 |
| 4,228,637 | 10/1980 | Richey et al. | 56/341 |

OTHER PUBLICATIONS

International Search Report dated May 11, 1987 for Related International Application No. PCT/US87/00309, filed Feb. 4, 1987.
Knapp et al., Agron. J., 68:120–123, 1976.
Lacey et al., Ann. Appl. Biol. 88:65–73, 1978.
Monograph No. 5808, The Merck Index, 10th Ed., p. 5806, 1983.
Cowman, G. L., Baling Hay at High Moisture Levels, paper presented at the 1984 Montana Nutrition Conference and the 1984 Kansas State University Formula Feed Conference.

Primary Examiner—R. B. Penland
Attorney, Agent, or Firm—Christensen, O'Connor, Johnson & Kindness

[57] ABSTRACT

Metam sodium (sodium methyl dithiocarbamate) for preserving high-moisture forage crops like hay and grain at application rates below about 4 lbs/T.

6 Claims, No Drawings

USE OF METAM SODIUM FOR PRESERVING HAY

FIELD OF THE INVENTION

This invention relates to the field of agricultural chemistry and particularly to compositions and methods for preserving high-moisture forage crop such as hay, grain, and silage.

BACKGROUND OF THE INVENTION

Some 150 million tons of hay are baled in the United States each year, yet hay losses are probably larger than those of any other crop. Dry matter losses in hay making can reportedly range from 10–71% due to the various physiological and mechanical processes that the crop undergoes from the time the plant is cut until the hay is safely stored. Microbial degradation leading to mold formation and heat generation is among the principal causes of field losses in hay making. Hay will spoil if baled at moistures much over 12% unless preservations are applied to prevent fungal spoilage. Microbial activity and chemical oxidation cause heating in hay containing more than 15% moisture. Heat generation in baled hay increases dry matter losses, reduces nutrient digestibility, particularly protein and causes discoloration. Spoilage also causes loss of palatability and production of toxins.

If the disadvantages of microbial degradation, particularly mold formation and heat generation, could be alleviated, baling hay at higher moisture levels could provide direct benefits to the grower. The field curing process could be shortened, thereby reducing the exposure of plant nutrients to the destructive actions of sun, rain, and microbes. Entire cuttings are frequently lost due to untimely rainfall, for example, and these losses could be curtailed by baling the hay sooner, at higher moisture levels. Without a hay preservative, hay dry enough to bale without spoiling is crisp, and the fragile plant parts that are the most nutritious crop components shatter easily and so are lost as chaff as the hay is tedded, raked and baled. Higher moisture content also increaes palatability and thus decreases waste after hay is harvested. Indirect losses associated with field drying could also be reduced by baling high-moisture hay. Tractor wheel damage to rejuvenating plant crowns can be reduced by minimizing the tedding and crimping manipulations that are typically used to foster field drying. In addition, the grower can irrigate and fertilize sooner, and thereby enhance the production of the next cutting. It is consequently desirable to devise treatments that permit the grower to bale hay at higher moisture levels, on the order of 12% to 30% moisture, without heating or molding.

It would also be desirable to devise treatments that permit storage without heating or molding of grains having moisture levels on the order of 13% to 28% moisture. For example, microbial degradation of milled grains that serve as poultry rations severely impacts the poultry industry. Poultry are particularly sensitive to mycotoxins. The poultry rations leave the mill at about 12% moisture content but are typically stored for several weeks in farm grain bins before being fed out to broilers, layers, and turkeys. Due to condensation during transport and storage, and also metabolic water production, the milled grains tend to spoil in the grain bins, and so the rations are routinely treated with mold inhibitors. Such preservation treatments cost the poultry farmer on the order of one dollar or more per ton of rations. Considering that some four billion broilers are raised annually in the U.S., each consuming an average eight pounds of rations, there is and has been a tremendous incentive to find more cost-effective preservative treatments for milled grains.

Many efforts have been made to provide compositions and methods for preserving high-moisture content crops such as hay and grain against the deleterious effects of microbial degradation. Propionic acid has been used with some success as a hay preservative. See, for example, *Agron.J.* 68:120–123, 1976; *Ann.Appl.Biol.* 88:65–73, 1978. Propionic acid has also been combined with a variety of adjuvants for reported synergistic effect. Indeed, many if not all of the current commercial hay preservative preparations rely upon propionic acid aas the sole or principal preservatively effective ingredient. Unfortunately, propionic acid is a volatile, pungent chemical that is highly corrosive to farm machinery.

Also of interest are references to the use of carbamate compounds, particularly sodium methyl dithiocarbamate, as antimicrobial agents. U.S. Pat. No. 2,792,327 discloses the application of sodium monomethyl dithiocarbamate to control fungus infestation of living vegetation. U.S. Pat No. 3,699,231 reports a synergistic mixture of sodium methyl dithiocarbamate and formaldehyde to inhibit the growth of sulfate reducing bacteria. U.S. Pat. No. 3,836,655 reports a synergistic mixture of sodium methyl dithiocarbamate and propionic acid for preserving moist grain during storage. See also: U.S. Pat. No. 2,614,957 (sodium dimethyl dithiocarbamate admixed with the sodium salt of 2-mercaptobenzothiazole); U.S. Pat. No. 2,614,959 (zinc dimethyl dithicarbamate admixed with the ferric salt of mercaptobenzothiazole); U.S. Pat. No. 2,776,922 (zinc salt of 2-mercaptobenzothiazole admixed with zinc salt of dimethyl dithio carbamic acidi); and U.S. Pat. No. 4,203,999 (antifuga bis (dithiocarbamate) salts).

SUMMARY OF THE INVENTION

Sodium methyl dithiocarbamate is applied at dosages of no more than about 4 pounds per ton of forage crop having up to 35 percent moisture content, in order to retard microbial degradation and thereby stabilize the forage crop. Suitable forage crops for stabilization by the subject method include hay crops, grains, and silage crops. The disclosed dosage rate is surprisingly low, considering other known uses of sodium methyl dithiocarbamate, and is unexpectedly more cost effective than propionic acid or commercial hay preservatives, while providing attendant advantages.

DETAILED DESCRIPTION OF THE PREFERRED EMBODIMENT

Pursuant to the invention, sodium methyl dithiocarbamate is applied at dosages of not more than about 4 pounds per ton of forage crop having less than 35 percent moisture content, in order to retard microbial degradation and thereby stabilize the forage crop. Suitable forage crops for preservation by the subject method include hay crops, grains, and silage crops. In a preferred embodiment, high-moisture hay crops are stabilized, meaning that heating and molding associated with microbial degradation of the crop are inhibited, by the application of a stabilizingly effective amount of sodium methyl dithiocarbamate. Hay crop as used herein refers to grasses and legumes such as alfalfa, timothy, and clover which are cut and dried for animal feed. Representative grains include whole and milled corn, wheat, oats, barley, rye, sorghum, millet, buckwheat, and rice, as well as mixtures of the same. By silage crops are meant agricultural substrates preserved by acid fermentation, which substrates may include the foregoing hay crops and grains and also corn, sugar cane, beet tops and pulp. By "high-moisture forage crop" is meant an agricultural substrate such as those discussed above containing from about 13 to about 30 and not more than 35 percent by weight moisture.

Applicant has discovered that sodium methyl dithiocarbamate effectively stabilizes high-moisture forage crops at surprisingly low dosages, at not more than about 2 pounds sodium methyl dithiocarbamate per ton wet weight of crop substrates containing less than about 30 percent by weight moisture. At 25 percent moisture content, only about 1 pound of sodium methyl dithiocarbamate per ton wet weight of hay is required to substantially inhibit heating and molding in hay bales. Due to the heterogeneity of actual field conditions it is considered preferred practice to field dry a cut hay crop to average moisture levels in the range of from about 25 to about 18 percent, at which moisture contents stabilizing dosages of sodium methyl dithiocarbamate range from about 1 to about 0.5 pounds per ton. Sodium methyl dithiocarbamate is also known as metam sodium, as well as by other chemical and trade names as listed, for example, in Monograph No. 5808, The Merck Index, 10th Ed., 1983, hereby incorporated by reference. It is contemplated that fungicidal derivatives of sodium methyl dithiocarbamate, including sodium dimethyl dithiocarbamate, may also be effective for stabilizing high-moisture forage crops at relatively low dosages.

The stabilizingly effective dosage of not more than about 4 pounds sodium methyl dithiocarbamate per wet ton of high-moisture forage crop is unexpectedly low, considering the heterogeneous substrates that hay crops and milled grains provide, and the compact and substantially isolated microenvironments in which they are put up and stored. Such substrates and environments are normally conducive to mold growth. Known preservative treatments involving sodium methyl dithiocarbamate have prescribed much higher application rates. Thus, the invention surprisingly provides a costeffective substitute for propionic acid, while avoiding the recognized disadvantageous side effects of the latter preservative. Sodium methyl dithiocarbamate (at 2 lbs/T,30% m) is significantly more cost effective as a forage crop stabilizer than either propionic acid or commercial preparations containing propionic acid applied at known and recommended dosage rates. Sodium methyl dithiocarbamate typically wholesales at roughly six times the bulk price of propionic acid. Comparative test data indicate that the available bulk price of propionic acid would have to be reduced by two-thirds for propionic acid to be cost effective at equivalent degrees of stabilizing protection with sodium methyl dithiocarbamate, the latter applied at about 2 pounds per wet weight ton of 30% moisture forage crop. Even then, sodium methyl dithiocarbamate is less destructive to farm machinery and more convenient to use. Relatively low volumes of spray need be applied, for example, with consequent economies in storage, handling, and fuel consumption.

The sodium methyl dithiocarbamate can be applied to highmoisture forage crops by conventional techniques. For example, for hay preservative applications an aqueous solution of sodium methyl dithiocarbamate can be sprayed onto high-moisture hay at the baler, prior to bailing. Alternatively, the sodium methyl dithiocarbamate may be applied in the form of a dust prepared, for example, by mixing anhydrous sodium methyl dithiocarbamate with a conventional inert, solid diluent such as lime, bentonite, talc, pyrophyllite, gypsum, chalk, or silica. The application should of course be uniform, that is, the sodium methyl dithiocarbamate should be evenly distributed throughout the crop mass in order to prevent the occurrence of spoiled slugs and hot spots. Considering the uncertainties associated with haymaking, including subjective assessments of field moisture contents, heterogeneous field conditions, and nonuniform applications from single-point sprayers, a stabilizingly effective dosage of about 4 pounds sodium methyl dithiocarbamate per wet ton hay is considered a practical and still cost-effective prescription.

The invention further provides articles of commerce useful for stabilizing high-moisture forage crops. Bottles, drums, sacks and like shipping receptacles containing measured amounts of sodium methyl dithiocarbamate are labeled with printed instructions for applying the contents to high-moisture forage crops at application rates effective to apply about 4 pounds or less sodium methyl dithiocarbamate per ton wet weight of the forage crop. As an example, a drum of 33% sodium methyl dithiocarbamate in aqueous solution is provided with attached or accompanying written instructions for diluting and applying the solution to high-moisture hay at dosages effective to apply no more than about 4 pounds sodium methyl dithiocarbamate per wet ton of hay. Coloring and flavoring agents may be added to the solution for convenience of application and enhancement of palatability, as can various masking agents that are routinely used in the industry.

While the present invention has been described in terms of a preferred embodiment, one of ordinary skill after reading the foregoing specification will be able to effect various changes, substitutions of equivalents, and other alterations to the compositions and methods set forth herein. It is therefore intended that the protection granted by Letters Patent hereon be limited only by the definition contained in the appended claims and equivalents thereof.

The embodiments of the invention in which an exclusive property or privilege is claimed are defined as follows:

1. A method of stabilizing a high-moisture hay crop comprising less than about 35 percent by weight moisture against microbial degradation, comprising the step of spraying said hay immediately prior to baling with an amount of a composition effective to retard microbial degradation and thereby stabilize said hay crop, said composition consisting essentially of sodium methyl dithiocarbamate and said stabilizingly effective amount comprising no more than about 4 pounds of sodium methyl dithiocarbamate per wet ton of said hay crop.

2. The method of claim 1 wherein said hay crop comprises less than about 30 percent by weight moisture and said stabilizingly effective amount comprises about 2 pounds of sodium methyl dithiocarbamate per wet ton of the said hay crop.

3. The method of claim 1 wherein said hay crop comprises less than about 25 percent by weight moisture and said stabilizingly effective amount comprises about 1 pound of sodium methyl dithiocarbamate per wet ton of the said hay crop.

4. The method of claim 1 wherein said hay crop comprises from about 25 to about 18 percent by weight moisture and said stabilizingly effective amount comprises from about 1 to about 0.5 pounds of sodium methyl dithiocarbamate per wet ton of the said hay crop.

5. An article useful for preserving hay comprising less than about 35 percent moisture, comprising a preservative composition consisting essentially of sodium methyl dithiocarbamate in combination with printed instructions for spraying a measured amount of said preservative composition on said hay immediately prior to baling, said printed instructions cooperating with said measured amount to effectively prescribe an application of not more than about 4 pounds of sodium methyl dithiocarbamate per ton wet weight of said hay.

6. The article of claim 5 comprising a drum of aqueous solution consisting essentially of about 33 percent sodium methyl dithiocarbamate in combination with printed instructions for applying said aqueous solution to hay at dosages effective to apply no more than about 4 pounds dry weight sodium methyl dithiocarbamate per wet ton of hay.

* * * * *